US010047856B2

(12) United States Patent
Kokko et al.

(10) Patent No.: US 10,047,856 B2
(45) Date of Patent: Aug. 14, 2018

(54) METHOD FOR ADJUSTING CLUTCH FILL COMMAND PRESSURE FOR A TRANSMISSION USING A LUBRICATION COMPENSATOR MODEL

(71) Applicant: GM GLOBAL TECHNOLOGY OPERATIONS LLC, Detroit, MI (US)

(72) Inventors: Kristopher J Kokko, Novi, MI (US); Thomas Weglarz, Farmington Hills, MI (US); Patrick M Gibson, Ann Arbor, MI (US); Jason Jousma, Holly, MI (US)

( * ) Notice: Subject to any disclaimer, the term of this patent is extended or adjusted under 35 U.S.C. 154(b) by 53 days.

(21) Appl. No.: 15/350,514

(22) Filed: Nov. 14, 2016

(65) Prior Publication Data

US 2018/0135747 A1 May 17, 2018

(51) Int. Cl.
*F16H 61/14* (2006.01)
*F16D 48/02* (2006.01)
*F16H 63/46* (2006.01)

(52) U.S. Cl.
CPC ........... *F16H 61/143* (2013.01); *F16D 48/02* (2013.01); *F16H 63/46* (2013.01); *F16D 2048/0203* (2013.01); *F16D 2300/06* (2013.01); *F16D 2500/1026* (2013.01); *F16D 2500/3024* (2013.01); *F16D 2500/3067* (2013.01); *F16D 2500/30401* (2013.01); *F16D 2500/30803* (2013.01); *F16D 2500/3144* (2013.01); *F16D 2500/5014* (2013.01)

(58) Field of Classification Search
CPC ... F16D 2500/3024; F16D 2500/30401; F16D 2500/3067; F16D 2500/30803; F16D 2500/30806; F16D 2500/2144; F16D 2500/70406; F16H 59/14; F16H 59/68; F16H 59/70; F16H 59/72; F16H 2059/366

See application file for complete search history.

(56) References Cited

U.S. PATENT DOCUMENTS

| 6,415,213 | B1* | 7/2002 | Hubbard | F16H 61/0437 701/51 |
| 9,242,629 | B2* | 1/2016 | Roblin | B60W 10/115 |
| 2014/0100748 | A1* | 4/2014 | Kim | B60W 10/023 701/68 |
| 2014/0315683 | A1* | 10/2014 | Roblin | B60W 10/115 477/86 |

FOREIGN PATENT DOCUMENTS

| EP | 0756111 A2 * | 1/1997 | F16H 61/04 |
| WO | WO-2014050727 A1 * | 4/2014 | F16D 48/066 |

* cited by examiner

*Primary Examiner* — Ramya P Burgess
*Assistant Examiner* — David R Morris

(57) ABSTRACT

A method for adjusting clutch fill command pressure for a transmission using a lubrication compensator model includes determining clutch fill line pressure and lubrication compensator model pressures, and adjusting the clutch fill command pressure to achieve the lubrication compensator model pressure based on the torque converter clutch status.

9 Claims, 5 Drawing Sheets

METHOD FOR ADJUSTING CLUTCH FILL COMMAND PRESSURE FOR A TRANSMISSION USING A LUBRICATION COMPENSATOR MODEL

FIELD

Apparatuses consistent with exemplary embodiments relate to a method for comprehending fluid fill command pressures for a rotating clutch assembly. More particularly, apparatuses consistent with an exemplary embodiment relate to method for adjusting clutch fill command pressure for a transmission using a lubrication compensator model.

BACKGROUND

A clutch assembly for a transmission is configured to selectively interconnect a first rotatable member with a second rotatable member by engagement of a clutch pack. The clutch assembly includes a piston dam and a piston which is axially moveable with respect to the piston dam and configured to selectively abut and engage the clutch pack to interconnect the first and second rotatable members.

A clutch housing encloses the piston, piston dam and clutch pack. A piston apply cavity is formed between the housing and piston to receive fluid from a clutch apply feed orifice to actuate the piston. A piston compensator cavity is formed between the piston dam and piston to receive fluid from a piston compensator feed orifice.

In order to achieve smooth, consistent shift feel quality when changing gears, a force balance between the piston apply cavity fluid and the piston compensator cavity fluid must be maintained. In conventional clutch assemblies, the piston compensator cavity fluid volume varies during clutch operation and must be frequently adjusted to maintain the force balance between the cavities and, in turn, smooth clutch operation.

Thus, there is a need for a method of comprehending the fluid volume variations that occur in the piston compensator cavity so that better fluid fill command pressures can be made when compensating for the fluid volume variations.

SUMMARY

One or more exemplary embodiments address the above issue by providing a method for comprehending fluid fill command pressures for a rotating clutch assembly. More particularly, apparatuses consistent with exemplary embodiments relate to a method for adjusting clutch fill command pressure for a transmission using a lubrication compensator model.

According to an aspect of an exemplary embodiment, method for adjusting clutch fill command pressure for a transmission using a lubrication compensator model includes determining clutch fill line pressure based on a torque request, transmission gear ratio, transfer gain, and pressure offset. Another aspect of the exemplary embodiment includes determining a torque converter clutch connection status. Still another aspect as according to the exemplary embodiment includes determining lubrication compensator model pressures based on the clutch fill line pressure, engine speed, transmission temperature, and the torque converter clutch connection status. Another aspect of the exemplary embodiment includes adjusting the clutch fill command pressure based upon the lubrication compensator model pressure.

And further aspects of the exemplary embodiment include selecting a predetermined lubrication compensation model pressure from a first array when the torque converter clutch status is locked, and selecting a predetermined lubrication compensation model pressure from a second array when the torque converter clutch status is unlocked.

In accordance with another aspect of the exemplary embodiment, the method includes using an accelerator pedal position sensor for determining the torque request. Still in accordance with another aspect of the exemplary embodiment, the method includes using a crankshaft position sensor for determining the engine speed. And another aspect of the exemplary embodiment includes using a transmission temperature sensor for determining the transmission temperature.

Yet a further aspect of the exemplary embodiment wherein a transmission control module determines the torque converter clutch status. And another aspect of the exemplary embodiment includes using a pressure transducer for determining lubrication compensator model pressures. Pressure transducers are used to populate the tables (305, 310, 315, 320, 325, and 330) in a development setting. In production, the transmission does not have pressure transducers. Still another aspect of the exemplary embodiment wherein the initial lubrication compensator pressure is used for determining the lubrication compensator model pressures based on the torque converter clutch status. And yet another aspect wherein adjusting further includes varying fluid flow rate with a fill solenoid to adjust the clutch fill command pressure.

According to an exemplary embodiment for a method of adjusting clutch fill command pressures for a transmission using a lubrication compensator model wherein the transmission is a ten (10) speed rear wheel drive transmission.

BRIEF DESCRIPTION OF THE DRAWINGS

The present exemplary embodiment will be better understood from the description as set forth hereinafter, with reference to the accompanying drawings, in which.

DETAILED DESCRIPTION OF THE INVENTION

The following description is merely exemplary in nature and is not intended to limit the present disclosure, application, or uses thereof.

Figure 1:
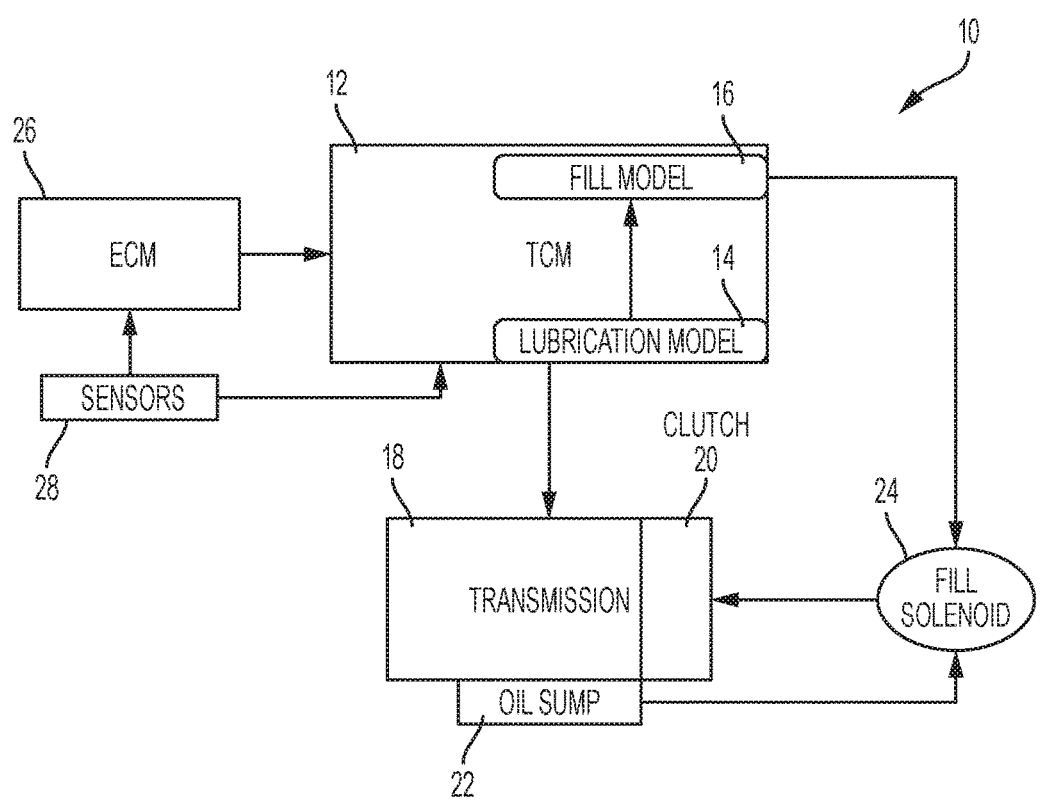
FIG. 1 is an illustration of a system block diagram for a method of adjusting clutch fill command pressures for a transmission using a lubrication compensator model in accordance with an exemplary embodiment.

FIG. 1 provides an illustration of a system block diagram 10 for a method of adjusting clutch fill command pressures for a transmission using a lubrication compensator model in accordance with an exemplary embodiment. A transmission control module (TCM) 12 is operative to use vehicle sensors 28 and other data provided by the vehicle components to calculate how and when to change gears in the vehicle for optimum performance, fuel economy and shift quality.

A lubrication model 14 and a fill model 16 are software subroutines stored within the TCM. The lubrication model 14 determines lubrication compensator pressures based on the clutch fill line pressure, engine speed, transmission temperature, and the torque converter clutch connection status. The fill model 16 is operative to provide a clutch fill command to achieve the lubrication compensator model pressure based on the torque converter clutch status in response to receiving lubrication compensator pressure information from the lubrication model 14.

A transmission 18 uses gears and gear trains to provide speed and torque conversions from an engine to the vehicle wheels. The transmission 18 clutch includes a clutch 20 operative to engage and disengage the transmission 18, especially from a driving shaft, to a driven shaft, and to the vehicle wheels. An oil sump 22 is in fluid communication with the transmission 18 and serves as a reservoir of oil for the transmission lubrication system.

A fill solenoid 24 is in communication with the transmission 18 and is controlled by the fill model 16 to adjust a clutch fill command pressure to achieve the lubrication compensator model pressure based on the torque converter clutch status in accordance with aspects of the exemplary embodiment. An engine control module (ECM) 26 is the brains of an engine management system. It controls the fuel mixture, ignition timing, variable cam timing and emissions controls.

The ECM 26 and the TCM 12 are in communication with sensors 28 to detect events or changes in its environment, and then provide a corresponding output. Sensors 28 may provide various types of output, but typically use electrical or optical signals.

Sensors 28 can include, for example, an accelerator position sensor (not shown) that senses the instantaneous position of an accelerator pedal, a brake pedal position sensor that senses the position of a brake pedal (also not shown), etc. The sensors 28 can then provide that information to the ECM 26 or TCM 12. Sensors 28 can also include, for example, engine speed sensors such as a crank position sensor that can detect position and/or speed of a crankshaft and/or a cam position sensor that can detect position and/or speed of a camshaft (not shown), and provide that information to the ECM 26 or TCM 12. For example, the crank position sensor can be used to detect position of crankshaft, and the cam position sensor can be used to detect position of camshaft (not shown).

In either case, the raw position signal (in terms of frequency (Hz)) can be sent to ECM 26 and conditioned/converted to speed (in terms of rpm). In this regard, the engine speed signals may be considered raw engine speed signals until signal conditioned by the ECM 26 or other signal conditioning circuitry. The sensors 28 can also include a wheel speed sensor (not shown) that can detect true vehicle speed and provide it to the ECM 26.

Sensors 28 can also include an accelerometer for monitoring engine knock or misfires, a torque sensor for measuring torque out of the engine, a transmission temperature sensor for determining the transmission temperature, and a manifold air pressure sensor for monitoring the air intake pressure of the engine. Other pressure sensors can be included to monitor the real time pressure of fluid within the clutch 20 such as a pressure transducer (not shown) for determining lubrication compensator model pressures in accordance with the exemplary embodiment. It is appreciated that although the exemplary embodiment uses a pressure transducer during the development process to populate the lubrication compensator model array tables 300, it is contemplated that an alternative embodiment may use a pressure transducer to measure lubrication pressure within the transmission.

Figure 1A:
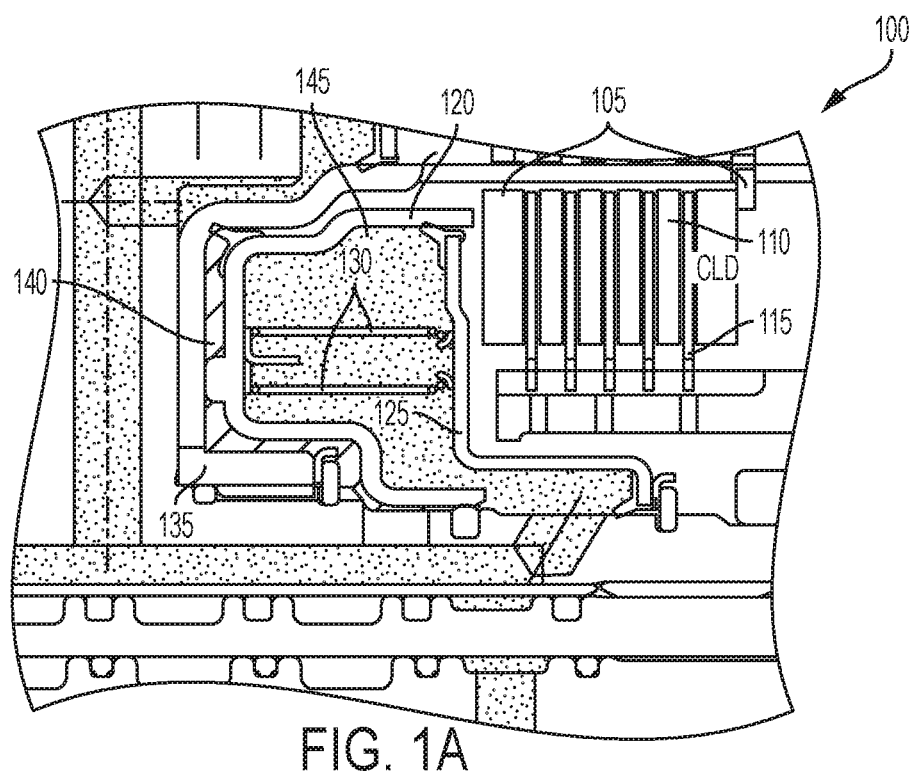
FIG. 1A is an illustration of a partial cross sectional view of a transmission assembly clutch pack in accordance with the exemplary embodiment.

Referring now to FIG. 1a, an illustration of a partial cross sectional view of a transmission assembly clutch pack 100 in accordance with the exemplary embodiment is provided. A clutch pack 105 includes a plurality of clutch plates 115 and plate spacers 110. A clutch piston 120 is axially moveable with respect to a clutch piston dam 125. The clutch piston 120 is configured to selectively abut and engage a clutch plate 115 of the clutch pack 105 to interconnect with a clutch housing 135. The clutch housing 135 encloses the clutch dam 125, the clutch piston 120 and clutch pack 105.

Clutch piston return springs 130 are disposed within a clutch piston compensator oil cavity 145. The clutch piston return springs 130 are operative to bias the clutch piston 120 away from the clutch pack 105 to assure that the clutch piston 120 is in a disengaged position with respect to the clutch pack 105 when the clutch housing 135 is rotating and the clutch piston 120 is desired released, and to assist the fluid in the clutch piston compensator oil cavity 145 in overcoming centrifugal pressure force which is applied against the piston 120 by fluid in a clutch apply piston oil cavity 140.

In order to achieve smooth, consistent shift feel quality when changing gears the force balance between the clutch apply piston oil cavity 140 and the clutch piston compensator oil cavity 145 must be maintained. In conventional clutch assemblies, the pressure of fluid in the clutch piston compensator oil cavity 145 varies during normal clutch operation and needs to be frequently adjusted to maintain the force balance between the cavities and, in turn, ensure smooth, consistent shift operation. However, currently there is no means to accurately determine the degree of pressure variation in the clutch piston compensator oil which makes adjusting it to maintain a consistent volume an estimation exercise. Overfilling the clutch apply piston oil cavity 140 could cause an abrupt, jerking type of shift while under filling the cavity 140 could cause a slow, delayed type of shift. The method in accordance with aspects of the exemplary embodiment seeks to address the issues relative to over and under filling.

Figure 2:
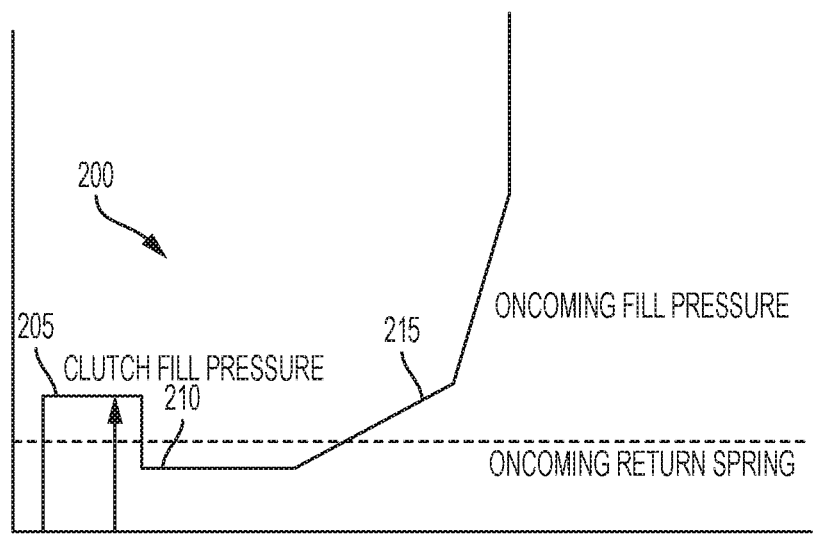
FIG. 2 is an illustration of graph of a piston apply fluid pressure curve in accordance with the exemplary embodiment.

Referring now to FIG. 2, an illustration of graph of a piston apply fluid pressure profile 200 is provided. The profile plateau 205 represents the piston apply oil pressure as the clutch fills. This plateau 205 will adjust up or down relative to the piston oil apply pressure which is influenced by the modeled piston compensator oil pressure. For example, when the piston compensator oil pressure increases, it takes additional clutch fill pressure to fill the clutch apply piston cavity 140. The piston apply oil pressure drops to plateau 210 immediately following the clutch fill event. This may occur when a gear shift is made and the clutch piston 120 is applied to engage the clutch pack 105. In accordance with aspects of the exemplary embodiment, the clutch apply piston pressure 140 is gradually adjusted on a ramp 215 to ensure that a smooth, consistent shift quality is achieved.

Figure 3:
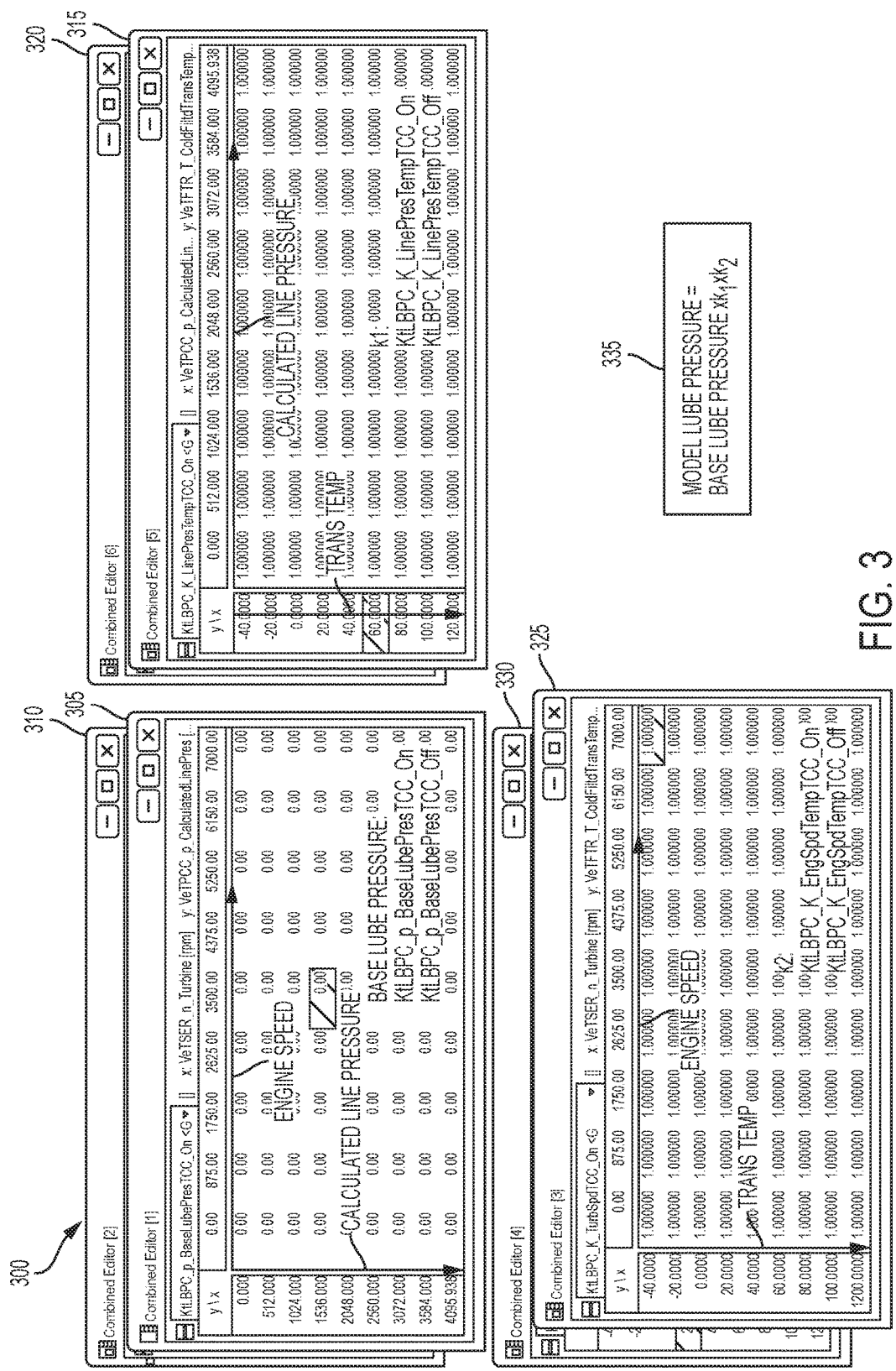
FIG. 3 is an illustration of lubrication compensator model pressure array tables based on torque converter clutch status in accordance with the exemplary embodiment.

Referring now to FIG. 3, an illustration of lubrication compensator model pressure array tables 300 based on torque converter clutch status are provided. A base lubrication pressure array 305 based on engine speed, a calculated clutch line pressure, and the torque clutch converter being locked (On) provides an array of base delta pressure values that are used to adjust the clutch fill command pressure based upon the lubrication compensator model pressure in accordance with the exemplary embodiment. Likewise, a base lubrication pressure array 310 (covered) based on engine speed, a calculated transmission line pressure, and the torque clutch converter being unlocked (Off) is provided.

Scaler arrays (315, 325) which contemplates a third variable, transmission temperature, are provided for comprehensively calculating the lubrication compensator model pressures based on calculated line pressure and transmission temperature when the torque converter clutch (TCC) is locked (On) according to equation (335):

(335) Lubrication Compensator Model Pressure=Base Lube Pressure*$k_1$*$k_2$

Likewise, scaler arrays (320, 330) are provided for comprehensively calculating the lubrication compensator model pressures based on engine speed and transmission temperature when the torque converter clutch (TCC) is unlocked (Off). The lubrication compensator model pressure arrays (310-330) are used by the lubrication 14 model to determine the appropriate clutch apply piston oil pressure that is needed to ensure smooth, consistent shift events. The lubrication model 14 transfers the piston compensator oil pressure information to the fill model which sends a fill pressure command to the fill solenoid 24 to adjust the fluid flow rate in accordance with the lubrication compensator model pressure. In accordance with aspects of the exemplary embodiment, the TCC status is managed by the TCM 12 and provided to the lubrication model 14. The array tables (305-330) are created based on pressure transducer outputs measured during a development process. It is appreciated that a real-time measurement of the compensator oil pressures may be obtained with an integrated sensor device or system without deviating from the scope and intent of the exemplary embodiment.

Figure 4:
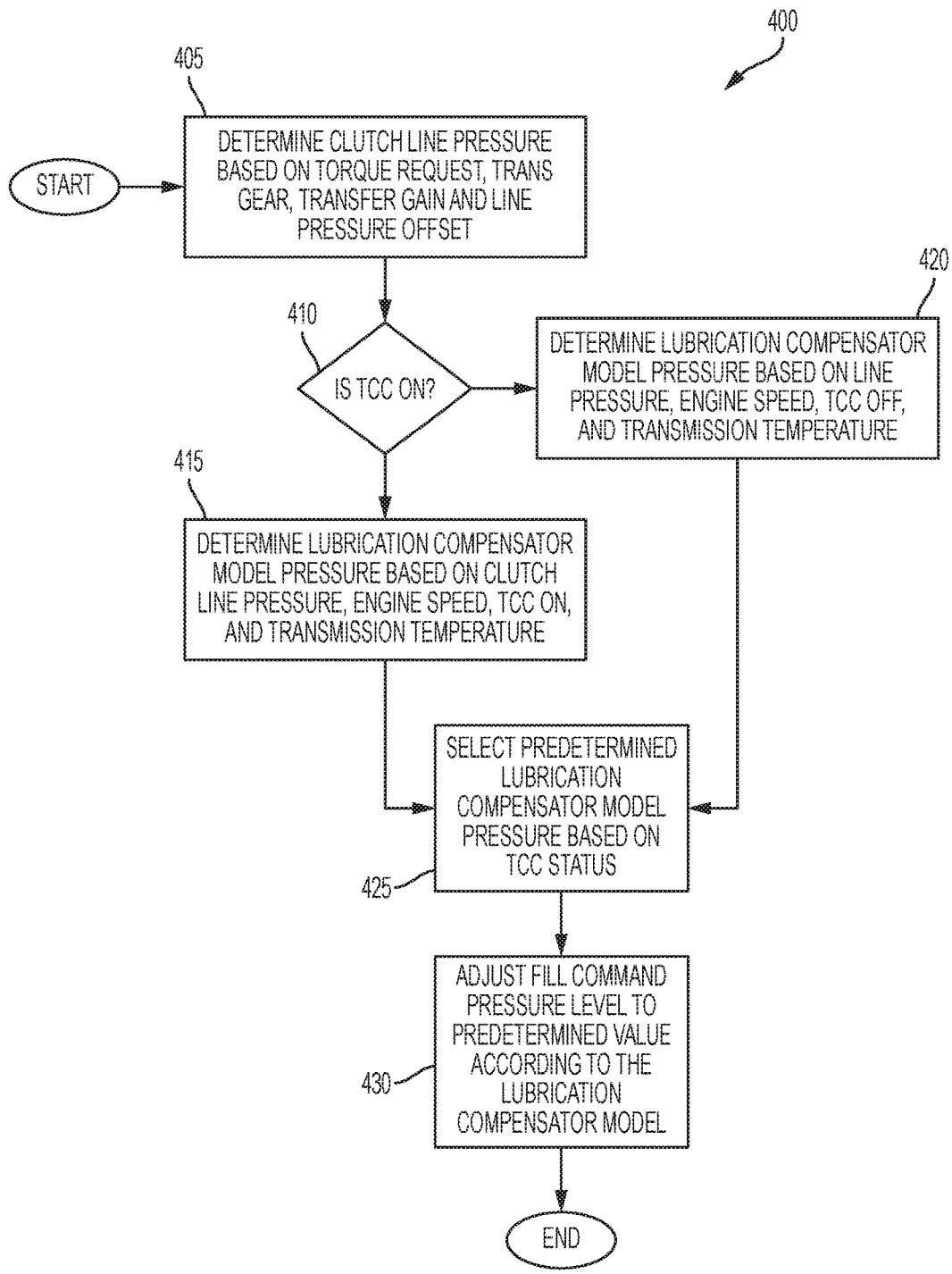
FIG. 4 is an illustration of an algorithm for a method of adjusting clutch fill command pressures for a transmission using a lubrication compensator model.

Referring now to FIG. 4, an illustration of an algorithm for a method of adjusting clutch fill command pressures for a transmission using a lubrication compensator model is provided. At block 405, the method begins with determining clutch fill line pressure based on a torque request, transmission gear ratio, transfer gain, and pressure offset. The calculation for line pressure being:

Line pressure=(Torque*Gear ratio Gain)+offset

In accordance with aspects of the exemplary embodiment, the torque request can be determined by an accelerator pedal position sensor which sends a signal to the ECM 26. The ECM calculates the torque request and sends the information to the TCM 12. The gear ratio and gain are determined by the TCM and the offset is predetermined.

At block 410, the method continues with determining a torque converter clutch connection status. The TCM 12 determines the TCC status. If the TCC is locked (On) then the method continues at block 415 with determining lubrication compensator model pressures based on the clutch fill line pressure, engine speed, transmission temperature, and the torque converter clutch connection status being locked. The engine speed may be determined using a crankshaft position sensor and indirectly transferred to the TCM 12 via the ECM 26 in accordance with the exemplary embodiment.

At block 420, the method continues with determining lubrication compensator model pressures based on the clutch fill line pressure, engine speed, transmission temperature, and the torque converter clutch connection status being unlocked (Off).

At block 425, the method continues with selecting a predetermined lubrication compensation model pressure from a first array when the torque converter clutch status is locked or unlocked.

At block 430, the method continues with adjusting the clutch fill command pressure based upon the lubrication compensator model pressure based on the torque converter clutch status. In accordance with the exemplary embodiment, the clutch fill command pressure is adjusted based on the pressure array tables (305-330). However, it is appreciated that a real-time measurement of the compensator oil pressures may be obtained with an integrated sensor device or system without deviating from the scope and intent of the exemplary embodiment. The above method may be generally to a several transmission clutch lubrication systems. In an exemplary embodiment according to the above disclosure a ten (10) rear wheel drive transmission clutch lubrication system is contemplated as suitable for using the application.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for adjusting clutch fill command pressure for a transmission using a lubrication compensator model comprising:
    determining clutch fill line pressure based on a torque request, transmission gear ratio, transfer gain, and pressure offset;
    determining a torque converter clutch connection status;
    determining lubrication compensator model pressures based on the clutch fill line pressure, engine speed, transmission temperature, and the torque converter clutch connection status; and
    adjusting the clutch fill command pressure based on the lubrication compensator model pressure.

2. The method of claim 1 further comprising selecting a predetermined lubrication compensation model pressure from a first array when the torque converter clutch status is locked.

3. The method of claim 1 further comprising selecting a predetermined lubrication compensation model pressure from a second array when the torque converter clutch status is unlocked.

4. The method of claim 1 further comprising using an accelerator pedal position sensor for determining the torque request.

5. The method of claim 1 further comprising using a crankshaft position sensor for determining the engine speed.

6. The method of claim 1 further comprising using a transmission temperature sensor for determining the transmission temperature.

7. The method of claim 1 wherein a transmission control module determines the torque converter clutch status.

8. The method of claim 1 wherein adjusting further comprises varying fluid flow rate with a fill solenoid to adjust the clutch fill command pressure.

9. A method for adjusting clutch fill command pressure for a transmission using a lubrication compensator model comprising:
    determining clutch fill line pressure based on a torque request, transmission gear ratio, transfer gain, and pressure offset;
    determining a torque converter clutch connection status;
    using a pressure transducer to determine initial lubrication compensator model pressures based on the clutch fill line pressure, engine speed, transmission temperature, and the torque converter clutch connection status wherein an initial lubrication compensator pressure is used for determining lubrication compensator model pressures based on the torque converter clutch status; and adjusting the clutch fill command pressure based on the lubrication compensator model pressure.

* * * * *